(12) United States Patent
Masser et al.

(10) Patent No.: US 8,627,147 B2
(45) Date of Patent: Jan. 7, 2014

(54) METHOD AND COMPUTER PROGRAM PRODUCT FOR SYSTEM TUNING BASED ON PERFORMANCE MEASUREMENTS AND HISTORICAL PROBLEM DATA AND SYSTEM THEREOF

(75) Inventors: Joel L. Masser, San Jose, CA (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 13/109,948

(22) Filed: May 17, 2011

(65) Prior Publication Data

US 2012/0297251 A1 Nov. 22, 2012

(51) Int. Cl.
*G06F 11/00* (2006.01)
(52) U.S. Cl.
USPC .............................................. 714/37; 702/183
(58) Field of Classification Search
USPC ............... 714/37, 40, 41, 47.1; 702/117, 118, 702/121, 183–185
See application file for complete search history.

(56) References Cited

U.S. PATENT DOCUMENTS

| 6,604,211 B1 * | 8/2003 | Heiman et al. | 714/41 |
|---|---|---|---|
| 7,089,456 B2 * | 8/2006 | Gender | 714/41 |
| 7,228,458 B1 * | 6/2007 | Kesavan | 714/41 |
| 7,350,113 B2 * | 3/2008 | Kearney et al. | 714/41 |
| 7,774,657 B1 | 8/2010 | Hardman | |
| 7,890,810 B1 * | 2/2011 | Coatney et al. | 714/41 |
| 2006/0117237 A1 | 6/2006 | Weller | |
| 2007/0162894 A1 | 7/2007 | Noller et al. | |
| 2007/0174917 A1 * | 7/2007 | Guruswamy | 726/25 |
| 2008/0256517 A1 | 10/2008 | Atkin et al. | |

* cited by examiner

*Primary Examiner* — Scott Baderman
*Assistant Examiner* — Joseph Kudirka
(74) *Attorney, Agent, or Firm* — Zilka-Kotab, PC

(57) ABSTRACT

According to one embodiment, a test system includes a data collection module adapted for collecting data from a test system, a storage module adapted for storing the collected data in an organized format, the data including problem data, associated configuration information, associated performance information, and activity data, an analysis module adapted for analyzing the collected data to define at least two activity zones by correlating the problem data, the associated configuration information, the associated performance information, and the activity data, the at least two activity zones including a safe zone where the test system operates normally and a danger zone where the test system is susceptible to operational problems, and an adjustment module adapted for adjusting available resources and/or workload of the test system to cause the test system to operate in the danger zone thereby increasing a likelihood of fault occurrence for testing purposes.

20 Claims, 3 Drawing Sheets

METHOD AND COMPUTER PROGRAM PRODUCT FOR SYSTEM TUNING BASED ON PERFORMANCE MEASUREMENTS AND HISTORICAL PROBLEM DATA AND SYSTEM THEREOF

BACKGROUND

The present invention relates to improving the testing of systems, and more particularly, to using configuration information, performance measurements, and historical problem data to tune systems to improve test effectiveness.

Organizations that participate in system testing and software testing are interested in running their test systems in ways that uncover/discover problems, especially problems that are disruptive to the system and/or software. Through experience, testers learn how to tune their systems and workloads to bring out problems. However, this is an intuitive, trial-and-error, subjective, and labor-intensive process. Further, the amount of information available for making tuning decisions is beyond any human's or collection of humans' ability to process. In addition, hardware and software used in the test system change often, requiring a relearning process as to how to stress and overload the test system.

Current methods of tuning systems exclusively use performance measurements to determine how to tune the system to avoid problems. This tends to make it difficult or impossible to replicate observed problems, and therefore testers are not capable of fully realizing what is causing problems.

According to one embodiment, a test system includes a data collection module adapted for collecting data from a test system, a storage module adapted for storing the collected data in an organized format, the data including problem data, associated configuration information, associated performance information, and activity data, an analysis module adapted for analyzing the collected data to define at least two activity zones by correlating the problem data, the associated configuration information, the associated performance information, and the activity data, the at least two activity zones including a safe zone where the test system operates normally and a danger zone where the test system is susceptible to operational problems, and an adjustment module adapted for adjusting available resources and/or workload of the test system to cause the test system to operate in the danger zone thereby increasing a likelihood of fault occurrence for testing purposes, wherein the problem data includes symptoms and/or markers of the problem.

In another embodiment, a method for tuning a system includes collecting data from a test system, the data including problem data, associated configuration information, associated performance information, and activity data, storing the collected data in an organized format, analyzing the collected data to define at least two activity zones by correlating the problem data, the associated configuration information, the associated performance information, and the activity data, the at least two activity zones including a safe zone where the test system operates normally and a danger zone where the test system is susceptible to operational problems, and adjusting available resources and/or workload of the test system to cause the test system to operate in the danger zone thereby increasing a likelihood of fault occurrence for testing purposes.

In yet another embodiment, a computer program product for tuning a system includes a computer readable storage medium having computer readable program code embodied therewith. The computer readable program code includes computer readable program code configured to: collect data from a test system, the data including problem data, associated configuration information, associated performance information, and activity data; store the collected data in a database; analyze the collected data to define at least two activity zones by correlating the problem data, the associated configuration information, the associated performance information, and the activity data, the at least two activity zones including a safe zone where the test system operates normally and a danger zone where the test system is susceptible to operational problems; and adjust available resources and/or workload of the test system to cause the test system to operate in the danger zone thereby increasing a likelihood of fault occurrence for testing purposes by adjusting the available resources and/or the workload of the test system includes at least one of: starting or stopping one or more jobs including a thrasher that consumes resources and/or causes timing variations, starting or stopping one or more transactions, starting or stopping one or more tasks, varying an available number of central processing units (CPUs), varying an available amount of memory, and bringing online or taking offline one or more input/output (I/O) devices. The associated configuration information includes at least one of: a number of CPUs operating, an amount of available memory, a number of I/O devices connected, and connected I/O device types, the problem data includes symptoms and/or markers of the problem, the associated performance information includes at least one of: I/O queuing information, an I/O activity rate, an I/O response time, CPU utilization, memory utilization, direct access storage device (DASD) response time, transaction response time, and paging information, and the activity data includes at least one of: a number of active transactions for each component and/or application of interest, a number of queued transactions for each component and/or application of interest, a number of jobs for each component and/or application of interest, and a number of tasks for each component and/or application of interest.

Other aspects and embodiments of the present invention will become apparent from the following detailed description, which, when taken in conjunction with the drawings, illustrates by way of example the principles of the invention.

DETAILED DESCRIPTION

Figure 1:
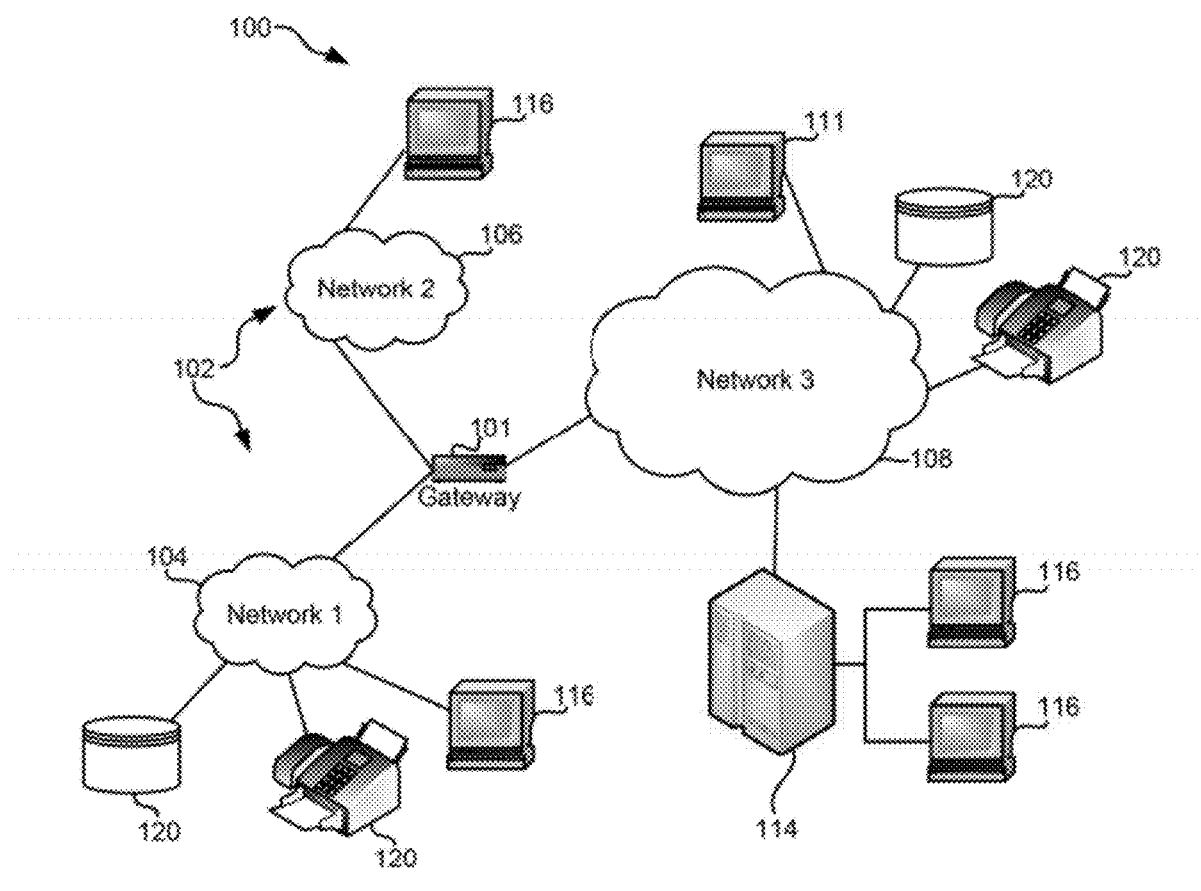
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the"

include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses a systematic approach that utilizes a test system's own computational power to be able to quickly tune the test system such that it can reproduce and/or uncover/discover problems that occur during use of the test system or to replicate problems that occurred during use of some other system. A new dimension of gathering and analyzing historical problem occurrence data is presented that spans multiple system components. At run time, current configuration and activity data may be compared to the historical data in order to determine appropriate tuning actions. Another new dimension is found in the tuning actions provided, going beyond simply starting jobs, transactions, or thrashers as is currently employed, with the capability to modify the system configuration. In addition, embodiments include the ability to cycle automatically through different parameter combinations, effectively varying the testing environment until a problem is encountered. Also, a hostile environment for clients to use during migration testing or when doing test comparisons with hardware from different vendors may be generated, in further embodiments.

According to one general embodiment, a test system includes a data collection module adapted for collecting data from a test system, a storage module adapted for storing the collected data in an organized format, the data including problem data, associated configuration information, associated performance information, and activity data, an analysis module adapted for analyzing the collected data to define at least two activity zones by correlating the problem data, the associated configuration information, the associated performance information, and the activity data, the at least two activity zones including a safe zone where the test system operates normally and a danger zone where the test system is susceptible to operational problems, and an adjustment module adapted for adjusting available resources and/or workload of the test system to cause the test system to operate in the danger zone thereby increasing a likelihood of fault occurrence for testing purposes, wherein the problem data includes symptoms and/or markers of the problem.

In another general embodiment, a method for tuning a system includes collecting data from a test system, the data including problem data, associated configuration information, associated performance information, and activity data, storing the collected data in an organized format, analyzing the collected data to define at least two activity zones by correlating the problem data, the associated configuration information, the associated performance information, and the activity data, the at least two activity zones including a safe zone where the test system operates normally and a danger zone where the test system is susceptible to operational problems, and adjusting available resources and/or workload of the test system to cause the test system to operate in the danger zone thereby increasing a likelihood of fault occurrence for testing purposes.

In yet another general embodiment, a computer program product for tuning a system includes a computer readable storage medium having computer readable program code embodied therewith. The computer readable program code includes computer readable program code configured to: collect data from a test system, the data including problem data, associated configuration information, associated performance information, and activity data; store the collected data in a database; analyze the collected data to define at least two activity zones by correlating the problem data, the associated configuration information, the associated performance information, and the activity data, the at least two activity zones including a safe zone where the test system operates normally and a danger zone where the test system is susceptible to operational problems; and adjust available resources and/or workload of the test system to cause the test system to operate in the danger zone thereby increasing a likelihood of fault occurrence for testing purposes by adjusting the available resources and/or the workload of the test system includes at least one of: starting or stopping one or more jobs including a thrasher that consumes resources and/or causes timing variations, starting or stopping one or more transactions, starting or stopping one or more tasks, varying an available number of CPUs, varying an available amount of memory, and bringing online or taking offline one or more I/O devices. The associated configuration information includes at least one of: a number of CPUs operating, an amount of available memory, a number of I/O devices connected, and connected I/O device types, the problem data includes symptoms and/or markers of the problem, the associated performance information includes at least one of: I/O queuing information, an I/O activity rate, an I/O response time, CPU utilization, memory utilization, direct access storage device (DASD) response time, transaction response time, and paging information, and the activity data includes at least one of: a number of active transactions for each component and/or application of interest, a number of queued transactions for each component and/or application of interest, a number of jobs for each component and/or application of interest, and a number of tasks for each component and/or application of interest.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic", a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to, a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
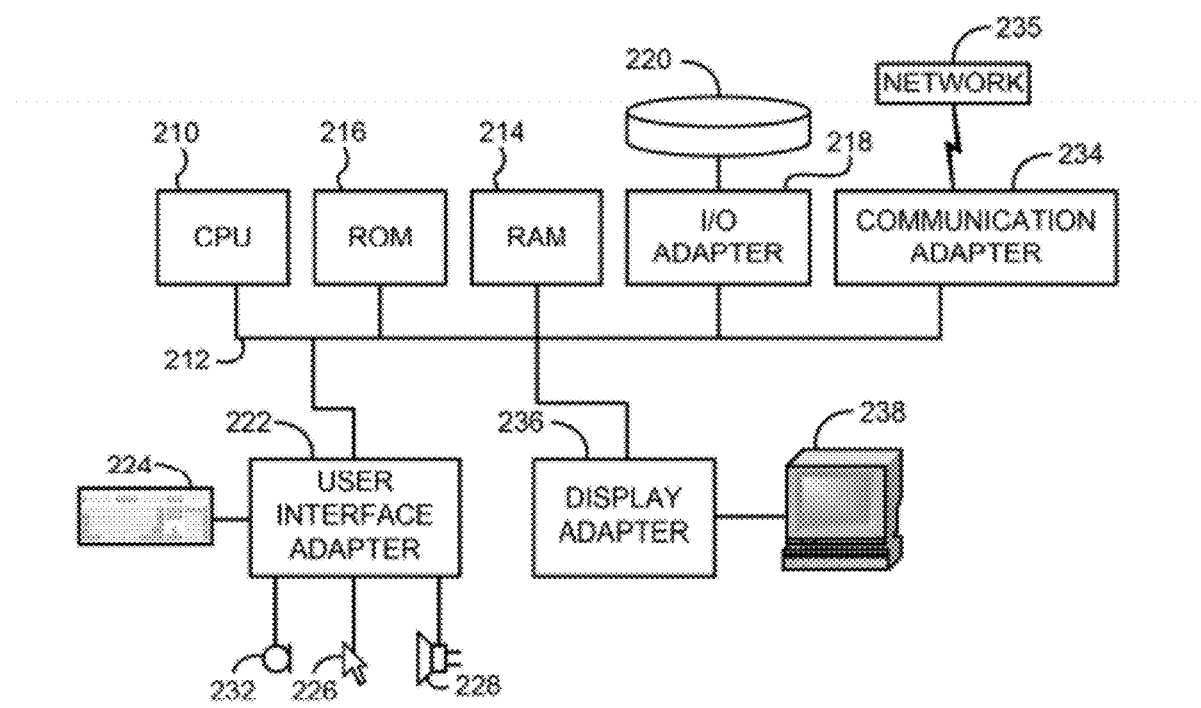
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

In one approach, historical data may be used to change test system attributes in order to make the occurrence of an error event or problem more likely than when historical data is not used. All other system tuning products that use historical data do so to optimize performance of the system and to avoid problem situations; in contrast, according to one embodiment, the tuning system may encourage problem situations by using historical data to determine how to stress the system in order to cause problems, which is the opposite approach to typical tuning systems.

Based on tester settings, according to one embodiment, the tuning system is capable of correlating problem occurrences with problem data, system configuration information, performance information, and activity data at a time of the problem to determine activity zones where problems are likely to happen or unlikely to happen in the system. The tuning system is also capable of monitoring system operation to capture effects of system changes, and automatically adjusting workloads and resources to stay in the activity zone where problems are likely to occur. In a more specific embodiment, an environment where a problem has occurred may be replicated in order to facilitate testing a proposed problem fix.

According to one embodiment, a test system comprises a data collection module adapted for collecting data from a test system, the data comprising problem data, associated configuration information, associated performance information, and activity data. The test system also includes a storage module adapted for storing the collected data in an organized format, an analysis module adapted for analyzing the collected data to define at least two activity zones by correlating the problem data, the associated configuration information, the associated performance information, and the activity data. The at least two activity zones comprise a safe zone where the test system operates normally, and a danger zone where the test system is susceptible to operational problems. The test system also includes an adjustment module adapted for adjusting available resources and/or workload of the test system to cause the test system to operate in the danger zone thereby increasing a likelihood of fault occurrence for testing purposes. The problem data comprises symptoms and/or markers of the problem.

The modules described herein may be embodied as logic, hardware, or software, according to various embodiments.

In one embodiment, the adjustment module may comprise logic adapted for at least one of: starting or stopping one or more jobs, starting or stopping one or more transactions, starting or stopping one or more tasks, varying an available number of CPUs, varying an available amount of memory, and bringing online or taking offline one or more I/O devices, wherein the one or more jobs comprise a thrasher that consumes resources and/or causes timing variations.

According to another embodiment, the test system may further comprise logic adapted for collecting additional data from the test system after adjusting the available resources and/or the workload of the test system, wherein the additional data comprises problem data, associated configuration information, associated performance information, and activity data.

In yet another embodiment, the test system may further comprise logic adapted for providing a graphical user interface for allowing a tester to set one or more parameters. In a further embodiment, the one or more parameters may comprise at least one of: which resources to adjust, which performance statistics to use, how to weight the performance statistics, a preference for whether resources or workload are adjusted, a desired problem occurrence probability, which configuration information to use, a new configuration frequency, and a desired variability.

According to one approach, the associated configuration information may comprise at least one of: a number of CPUs operating, an amount of available memory, a number of I/O devices connected, and connected I/O device types.

In another approach, the associated performance information may comprise at least one of: I/O queuing information, an I/O activity rate, an I/O response time, CPU utilization, memory utilization, direct access storage device (DASD) response time, transaction response time, and paging information.

In yet another approach, the activity data may comprise at least one of: a number of active transactions for each component and/or application of interest, a number of queued transactions for each component and/or application of interest, a number of jobs for each component and/or application of interest, and a number of tasks for each component and/or application of interest.

In one embodiment, the organized format may comprise a database, a list, a spreadsheet, etc.

The collected data that is stored to the organized format comprises a collection of historical data that may be used to tune the test system to increase the likelihood of errors and/or problems being produced during operation of the test system, according to preferred embodiments.

In another embodiment, the analysis module may comprise linear regression.

Figure 3:
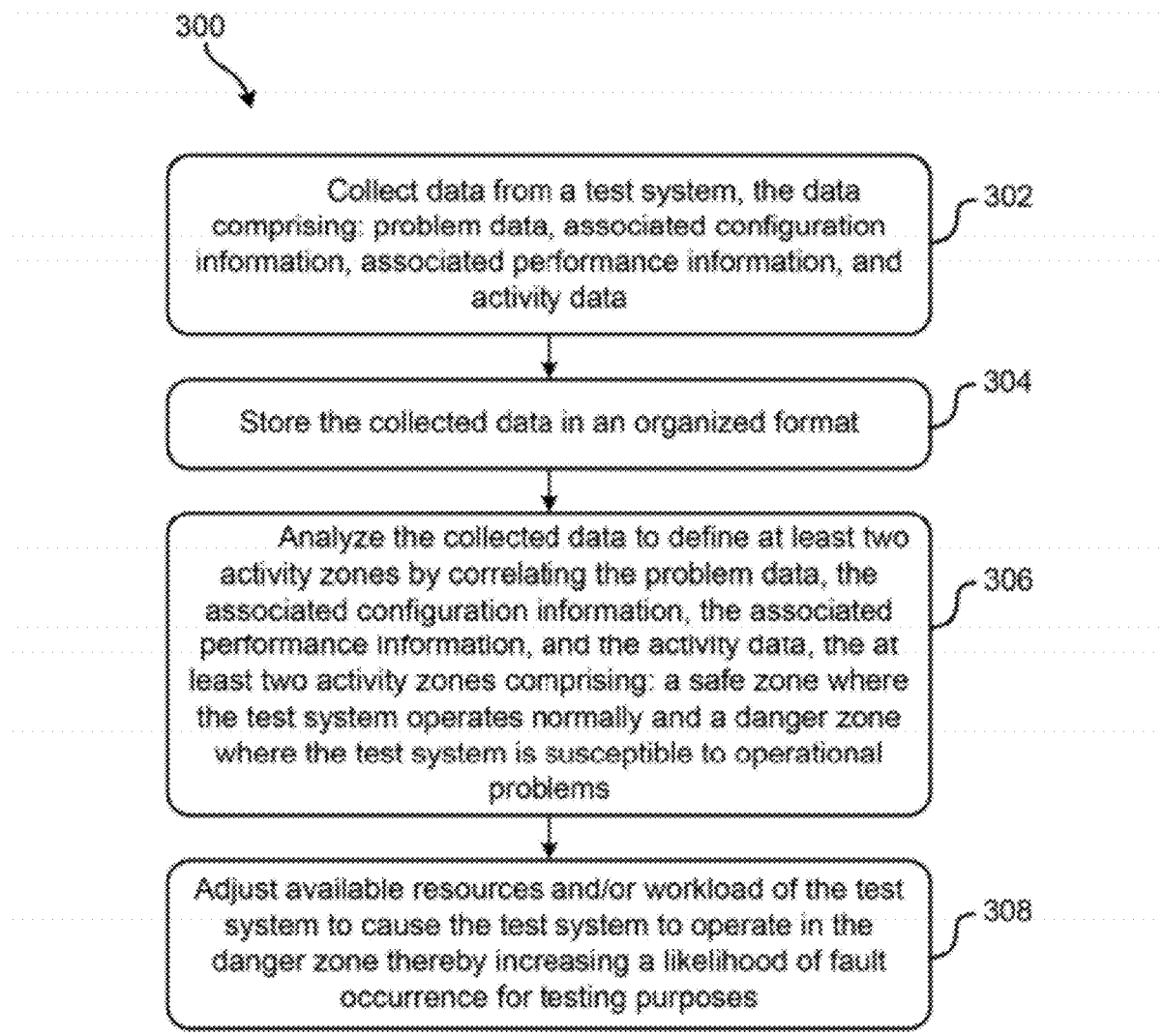
FIG. 3 illustrates a flowchart of a method, according to one embodiment.

Now referring to FIG. 3, a method 300 for tuning a system is shown according to one embodiment. The method 300 may be carried out in any desired environment, such as those described in FIGS. 1-2, among others.

In operation 302, data from a test system is collected, the data comprising problem data, associated configuration information, associated performance information, and activity data.

In one approach, the problem data may comprise symptoms and/or markers of the problem. In another approach, the associated configuration information may comprise at least one of: a number of CPUs operating, an amount of available memory, a number of I/O devices connected, and connected I/O device types. According to another approach, the associated performance information may comprise at least one of: I/O queuing information, an I/O activity rate, an I/O response time, CPU utilization, memory utilization, direct access storage device (DASD) response time, transaction response time, and paging information. And, in another approach, the activity data may comprise at least one of: a number of active transactions for each component and/or application of interest, a number of queued transactions for each component and/or application of interest, a number of jobs for each component and/or application of interest, and a number of tasks for each component and/or application of interest.

The data may be collected at a customer site or at a local site where the test system is located, e.g., the data may be pushed to the test system or it may be pulled from a customer site system.

In operation 304, the collected data is stored in an organized format. In some approaches, the organized format may comprise a database, a list, a spreadsheet, or any other organized format as known in the art.

In operation 306, the collected data is analyzed to define at least two activity zones by correlating the problem data, the associated configuration information, the associated performance information, and the activity data. The at least two activity zones comprise a safe zone where the test system operates normally, and a danger zone where the test system is susceptible to operational problems.

In one approach, analyzing the collected data may comprise linear regression or any other analysis technique as would be known to one of skill in the art.

In operation 308, available resources and/or workload of the test system are adjusted to cause the test system to operate in the danger zone thereby increasing a likelihood of fault occurrence for testing purposes. In one embodiment, adjusting the available resources and/or the workload of the test system may comprise at least one of starting or stopping one or more jobs, starting or stopping one or more transactions, starting or stopping one or more tasks, varying an available number of CPUs, varying an available amount of memory, and bringing online or taking offline one or more I/O devices.

In a further approach, the one or more jobs may comprise a thrasher that consumes resources and/or causes timing variations.

In another embodiment, the method 300 may comprise collecting additional data from the test system after adjusting the available resources and/or the workload of the test system. In one embodiment, the additional data may comprise problem data, associated configuration information, associated performance information, and activity data.

According to another approach, the method 300 may include allowing a tester to set one or more parameters. In a further approach, the tester may be provided with a graphical user interface for allowing the tester to set the one or more parameters. This allows the tester to focus on aspects of the test system, such as a component, application, etc., that is to be tested. For example, if a network part is to be examined, parameters of interest may include Internet statistics, and for a CPU, parameters of interest may include processing, and it might be different for other parts throughout the system.

In another example, to change memory, one might take memory out of the system and tell the tester whether it is permitted to take memory offline, or preferentially take up more jobs to soak up memory, etc.

In addition, the test system may be variably taken into and out of the danger zone, so some instructions may be supplied by the tester about how the system is to be taken in and out of the danger zone during the course of a test. In another embodiment, a maximum duration may be set for a particular test before trying some other method to produce a problem.

In yet another embodiment, the one or more parameters may comprise at least one of which resources to adjust, which performance statistics to use, how to weight the performance statistics, a preference for whether resources or workload are adjusted, a desired problem occurrence probability, which configuration information to use, a new configuration frequency, and a desired variability.

In one approach, the collected data may comprise at least one of: CPU operating information, memory information, direct access storage device (DASD) response time, transaction response time, queuing information, paging information, I/O queuing information, a number of jobs active, transaction rates, service request rates, and application-specific measurements.

According to another embodiment, a computer program product for tuning a system comprises a computer readable storage medium having computer readable program code embodied therewith. The computer readable program code comprises computer readable program code configured to: collect data from a test system, the data comprising problem data, associated configuration information, associated performance information, and activity data; store the collected data in a database; analyze the collected data to define at least two activity zones by correlating the problem data, the associated configuration information, the associated performance information, and the activity data, the at least two activity zones comprising a safe zone where the test system operates normally and a danger zone where the test system is susceptible to operational problems; and adjust available resources and/or workload of the test system to cause the test system to operate in the danger zone thereby increasing a likelihood of fault occurrence for testing purposes by adjusting the available resources and/or the workload of the test system comprises at least one of: starting or stopping one or more jobs comprising a thrasher that consumes resources and/or causes timing variations, starting or stopping one or more transactions, starting or stopping one or more tasks, varying an available number of CPUs, varying an available amount of memory, and bringing online or taking offline one or more I/O devices.

The associated configuration information comprises at least one of: a number of CPUs operating, an amount of available memory, a number of I/O devices connected, and connected I/O device types, the problem data comprises symptoms and/or markers of the problem, the associated performance information comprises at least one of: I/O queuing information, an I/O activity rate, an I/O response time, CPU utilization, memory utilization, direct access storage device (DASD) response time, transaction response time, and paging information, and the activity data comprises at least one of: a number of active transactions for each component and/or application of interest, a number of queued transactions for each component and/or application of interest, a number of jobs for each component and/or application of interest, and a number of tasks for each component and/or application of interest.

In another embodiment, the computer program product further comprises computer readable program code configured to collect additional data from the test system after adjusting the available resources and/or the workload of the test system, the additional data comprising problem data, associated configuration information, associated performance information, and activity data.

In yet another embodiment, the computer program product further comprises computer readable program code configured to provide a graphical user interface for allowing a tester to set one or more parameters, wherein the one or more parameters comprise at least one of: which resources to adjust, which performance statistics to use, how to weight the performance statistics, a preference for whether resources or workload are adjusted, a desired problem occurrence probability, which configuration information to use, a new configuration frequency, and a desired variability (e.g., how often to try a new configuration if no problems are found), among others.

At a certain interval, the computer readable program code for adjusting the available resources and/or workload of the test system to cause the test system to operate in the danger zone by adjusting the available resources and/or the workload of the test system may vary the environment until a problem is encountered. For example, if the adjusting code determines that paging should be increased, it has several methods to do this: starting jobs that acquire and cycle through virtual storage, starting jobs that fix numerous pages, varying storage offline, increasing page data set space, etc.

In preferred embodiments, a feedback loop may be included in any embodiment described herein such that data can continue to be gathered and analyzed to refine the at least two zones used to tune the test system. This feedback loop may run during system testing, where problems may occur and information and data may be collected, so the test system is monitored and additional data may be collected with new problems that may occur.

When attempting to reproduce one problem, some other (novel) problems may occur, and that's a good result because more data about how problems are generated is now generated from the test system.

In more embodiments, the analyzer may use standard statistical analysis, such as linear regression, to determine activity levels and performance goals for the components and applications of interest that are predicted to produce a problem with a baseline configuration with user-specified probability of success within a certain period of time. The activity levels may be expressed in terms such as transactions per second per CPU or transactions per second per megabyte of memory. Performance measures may be used as targets without normalization. At first, an amount of data sufficient to produce reliable results may not be available. Over time, as more problem data is accumulated, the predicted activity rates may become more reliable.

The adjusting module may monitor the current configuration, performance, and activity, compare the current configuration to the baseline configuration, and make adjustments to the configuration and running workloads to approximate the performance goals and bringing the system load up to the level determined by the analyzing module for producing a problem. Over time, the adjusting module may continue to monitor test system operations and make further adjustments until a problem is encountered.

More than just functional testing where if something works or not may be used, but with system testing, a low amount of stress may be placed on the test system, and whether that causes other errors may be observed, such as timing problems, hangs, loops, etc.

This type of system testing relates to system performance. It has to do with exercising the test system by utilizing some resources, and seeing if errors can be found that way—such as if the system is short of memory, bandwidth in the I/O, etc.

These problems may be hard or impossible to reproduce after initial discovery, especially when reported by system users because there may be differences between the test system and the system experiencing problems. In addition, systems change over time, so what may have previously been stressful to the test system may no longer be stressful with new updates.

In order to avoid unnecessary and superfluous testing, it is helpful to keep the test system in a zone where it is stressful and problems are more likely to occur. Historical data can aid in this endeavor by allowing past stress levels to be repeated and evolved, while non-stressful situations are avoided since errors likely will not occur there. This is a way to quantify stress levels that affect the system operation, so this is a way to identify the threshold stress levels that will cause errors for system testing.

As problems start occurring, system data is gathered about resource availability, use, configuration (memory information, bandwidth information, CPU information, RAM information, etc.) and then the existence of problems is correlated with certain levels of utilization of those resources. Where a problem is encountered, the system is observed and then the level of utilization of the resources is adjusted up to levels that have caused problems in the past.

According to several embodiments, the computer program product may be installed on a customer system, or it may be part of a software pipeline to test systems and products, and system interactions with products.

After the system information and data is gathered from the customer site, the test system may be reconfigured to mirror the system at the customer site as closely as possible for testing purposes. Then, the test system may be tuned up to the level the customer is utilizing. For example, the number of processors and the levels of utilization may be matched (or activity, which could vary depending on the type of product) for each. Also, the number and rate of transactions is monitored (packets, queries, I/O, etc.) on the system similar to the resources, and this is another characteristic that may be reproduced.

In one embodiment, a data gathering module may be distributed to various customer sites that are willing to have it installed for future uses.

The data gathering may make use of packaged data, data dumps, sent data in response to a request, received data, etc., as would be understood by one of skill in the art upon reading the present descriptions.

The test system may be a multi-purpose system capable of emulating any number of customer configurations and/or systems for application/component testing. In another embodiment, the test system may be dedicated to a single purpose. In various embodiments, the test system may be dedicated or matched to a consumer site, or several sites which are reasonably similar in configuration. In practice, it is more likely that it would be adapted for several configurations. For example, it is often useful to have multiple systems running to reach high enough stress levels, but even so, resources may need to be increased to produce errors.

In one embodiment, the baseline configuration may be a representation of a customer system using the test system. Since the test system does not necessarily include all the same components, applications, etc., as the customer system, the test system is adjusted to approximate the customer system, which is called the baseline configuration. This baseline configuration may then be adjusted to produce problems and/or errors.

The database, in some approaches, may include a plurality of problems found in testing from which to draw upon while testing. That is a proxy for the knowledge that an experienced tester has in his or her head, e.g., if the minimum number of jobs when a problem occurs is 32, the test system would have no reason to run any less than 32 jobs.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A test system, comprising:
a hardware processor configured to allow functioning of logic and modules;
a data collection module adapted for collecting data from a test system, the data comprising:
problem data, associated configuration information, associated performance information, and activity data;
a storage module adapted for storing the collected data in an organized format;

an analysis module adapted for analyzing the collected data to define at least two activity zones by correlating the problem data, the associated configuration information, the associated performance information, and the activity data, the at least two activity zones comprising:
a safe zone where the test system operates normally, and
a danger zone where the test system is susceptible to operational problems; and
an adjustment module adapted for adjusting available resources and/or workload of the test system to cause the test system to operate in the danger zone thereby increasing a likelihood of fault occurrence for testing purposes,
wherein the problem data comprises symptoms and/or markers of the problem.

2. The test system as recited in claim 1, wherein the adjustment module comprises logic adapted for at least one of: starting or stopping one or more jobs on the test system, starting or stopping one or more transactions on the test system, starting or stopping one or more tasks on the test system, varying an available number of central processing units (CPUs) available to the test system, varying an available amount of memory available to the test system, and bringing online or taking offline one or more input/output (I/O) devices of the test system.

3. The test system as recited in claim 2, wherein the one or more jobs comprise a thrasher that consumes resources and/or causes timing variations.

4. The test system as recited in claim 1, further comprising logic adapted for collecting additional data from the test system after adjusting the available resources and/or the workload of the test system, wherein the additional data comprises problem data, associated configuration information, associated performance information, and activity data.

5. The test system as recited in claim 1, further comprising logic adapted for allowing a tester to set one or more parameters, wherein the one or more parameters comprise at least one of: which resources to adjust, which performance statistics to use, how to weight the performance statistics, a preference for whether resources or workload are adjusted, a desired problem occurrence probability, which configuration information to use, a new configuration frequency, and a desired variability.

6. The test system as recited in claim 1, wherein the associated configuration information comprises at least one of: a number of CPUs operating, an amount of available memory, a number of I/O devices connected, and connected I/O device types.

7. The test system as recited in claim 1, wherein the associated performance information comprises at least one of: I/O queuing information, an I/O activity rate, an I/O response time, CPU utilization, memory utilization, direct access storage device (DASD) response time, transaction response time, and paging information.

8. The test system as recited in claim 1, wherein the activity data comprises at least one of: a number of active transactions for each component and/or application of interest, a number of queued transactions for each component and/or application of interest, a number of jobs for each component and/or application of interest, and a number of tasks for each component and/or application of interest.

9. A method for tuning a system, the method comprising:
collecting data from a test system, the data comprising:
problem data, associated configuration information, associated performance information, and activity data,
wherein the associated configuration information comprises available information selected from:
a number of central processing units (CPUs) operating;
an amount of available memory;
a number of input/output (I/O) devices connected; and
connected I/O device types,
wherein the associated performance information comprises available information selected from:
I/O queuing information;
an I/O activity rate;
an I/O response time;
CPU utilization;
memory utilization;
direct access storage device (DASD) response time;
transaction response time; and
paging information;
storing the collected data in an organized format;
analyzing the collected data to define at least two activity zones by correlating the problem data, the associated configuration information, the associated performance information, and the activity data, the at least two activity zones comprising:
a safe zone where the test system operates normally, and
a danger zone where the test system is susceptible to operational problems; and
adjusting available resources and/or workload of the test system to cause the test system to operate in the danger zone thereby increasing a likelihood of fault occurrence for testing purposes.

10. The method as recited in claim 9, wherein adjusting the available resources and/or the workload of the test system comprises two or more of: starting or stopping one or more jobs for each component and/or application of interest on the test system, starting or stopping one or more transactions for each component and/or application of interest on the test system, starting or stopping one or more tasks for each component and/or application of interest on the test system, varying an available number of CPUs, varying an available amount of memory, and bringing online or taking offline one or more I/O devices.

11. The method as recited in claim 10, wherein the one or more jobs comprise a thrasher that consumes resources and/or causes timing variations.

12. The method as recited in claim 9, further comprising collecting additional data from the test system after adjusting the available resources and/or the workload of the test system, the additional data comprising problem data, associated configuration information, associated performance information, and activity data.

13. The method as recited in claim 9, further comprising allowing a tester to set one or more parameters, wherein the one or more parameters comprise at least one of: which resources to adjust, which performance statistics to use, how to weight the performance statistics, a preference for whether resources or workload are adjusted, a desired problem occurrence probability, which configuration information to use, a new configuration frequency, and a desired variability.

14. The method as recited in claim 9, wherein the associated configuration information comprises all of: the number of CPUs operating, the amount of available memory, the number of I/O devices connected, and the connected I/O device types.

15. The method as recited in claim 9, wherein the associated performance information comprises all of: the I/O queuing information, the I/O activity rate, the I/O response time, the CPU utilization, the memory utilization, the direct access storage device (DASD) response time, transaction response time, and paging information.

16. The method as recited in claim 9, wherein the activity data comprises at least one of: a number of active transactions for each component and/or application of interest, a number of queued transactions for each component and/or application of interest, a number of jobs for each component and/or application of interest, and a number of tasks for each component and/or application of interest.

17. The method as recited in claim 9, wherein the problem data comprises symptoms and/or markers of the problem.

18. A computer program product for tuning a system, the computer program product comprising a computer readable storage medium having computer readable program code embodied therewith, the computer readable program code comprising:
- computer readable program code configured to collect data from a test system, the data comprising:
  - problem data, associated configuration information, associated performance information, and activity data;
- computer readable program code configured to store the collected data in a database;
- computer readable program code configured to analyze the collected data to define at least two activity zones by correlating the problem data, the associated configuration information, the associated performance information, and the activity data, the at least two activity zones comprising:
  - a safe zone where the test system operates normally, and
  - a danger zone where the test system is susceptible to operational problems; and
- computer readable program code configured to adjust available resources and/or workload of the test system to cause the test system to operate in the danger zone thereby increasing a likelihood of fault occurrence for testing purposes by adjusting the available resources and/or the workload of the test system, the adjusting comprising starting or stopping a thrasher that consumes resources and at least one of: starting or stopping one or more jobs for each component and/or application of interest on the test system, starting or stopping one or more transactions for each component and/or application of interest on the test system, starting or stopping one or more tasks for each component and/or application of interest on the test system, varying an available number of central processing units (CPUs) available to the test system, varying an available amount of memory available to the test system, and bringing online or taking offline one or more input/output (I/O) devices, wherein the associated configuration information comprises at least one of: a number of CPUs operating, an amount of available memory, a number of I/O devices connected, and connected I/O device types, wherein the problem data comprises symptoms and/or markers of the problem, wherein the associated performance information comprises at least one of: I/O queuing information, an I/O activity rate, an I/O response time, CPU utilization, memory utilization, direct access storage device (DASD) response time, transaction response time, and paging information, and wherein the activity data comprises at least one of: a number of active transactions for each component and/or application of interest, a number of queued transactions for each component and/or application of interest, a number of jobs for each component and/or application of interest, and a number of tasks for each component and/or application of interest.

19. The computer program product as recited in claim 18, further comprising computer readable program code configured to collect additional data from the test system after adjusting the available resources and/or the workload of the test system, the additional data comprising problem data, associated configuration information, associated performance information, and activity data.

20. The computer program product as recited in claim 18, further comprising computer readable program code configured to provide a graphical user interface for allowing a tester to set one or more parameters, the one or more parameters comprising at least: which resources to adjust, which performance statistics to use, how to weight the performance statistics, a preference for whether resources or workload are adjusted, a desired problem occurrence probability, which configuration information to use, a new configuration frequency, and a desired variability.

* * * * *